(12) United States Patent
Korenshtein et al.

(10) Patent No.: US 6,964,052 B1
(45) Date of Patent: Nov. 8, 2005

(54) CACHING OUTPUT FROM AN OBJECT IN AN APPLICATION SERVER ENVIRONMENT

(75) Inventors: Roni Korenshtein, Los Gatos, CA (US); Rajesh Narayanaswamy, Sunnyvale, CA (US)

(73) Assignee: E★Trade, Menlo Park, CA (US)

( * ) Notice: Subject to any disclaimer, the term of this patent is extended or adjusted under 35 U.S.C. 154(b) by 0 days.

(21) Appl. No.: 09/484,609

(22) Filed: Jan. 18, 2000

(51) Int. Cl.[7] ............................................. G06F 9/00
(52) U.S. Cl. ...................... 719/319; 709/231; 711/118
(58) Field of Search ........................... 709/2, 317, 203, 709/231; 719/317, 319; 711/118

(56) References Cited

U.S. PATENT DOCUMENTS

| | | | | |
|---|---|---|---|---|
| 5,852,717 A | * | 12/1998 | Bhide et al. ................ | 709/203 |
| 6,049,847 A | * | 4/2000 | Vogt et al. ................... | 710/309 |
| 6,173,310 B1 | * | 1/2001 | Yost et al. ................... | 709/201 |
| 6,192,364 B1 | * | 2/2001 | Baclawski ................... | 707/10 |
| 6,279,041 B1 | * | 8/2001 | Baber et al. ................ | 709/232 |
| 6,389,460 B1 | * | 5/2002 | Stewart et al. .............. | 709/217 |
| 6,401,118 B1 | * | 6/2002 | Thomas ....................... | 709/224 |
| 6,470,383 B1 | * | 10/2002 | Leshem et al. ............. | 709/223 |

OTHER PUBLICATIONS

Vishi Natarajan, "Partial Content Caching in Netscape Application Server", 1999, p. 1-8.*
DevEdge, "Intergrating NAS, Netscape Extensions and COBRA", p. 1-16.*
Kiva "Developing Kiva Applications", 1997, p. 71-74, 81-110, and 344-353.*
Kiva "Developing Kiva Applications", 1997, p. 13-16.*
Kiva "Developing Kiva Applications", 1997, p. 75-80, and 278-301.*

* cited by examiner

*Primary Examiner*—Meng-Al T. An
*Assistant Examiner*—Phuong N. Hoang
(74) *Attorney, Agent, or Firm*—Blakely, Sokoloff, Taylor & Zafman LLP

(57) ABSTRACT

A method and system of streaming a page of data are described. In one embodiment, an object corresponding to the page of data is allocated. The object is executed. If the object is a proxy, then the proxy is executed. If the object is a component, then the component is executed. If the object is a container, then the container is executed.

40 Claims, 16 Drawing Sheets

CACHING OUTPUT FROM AN OBJECT IN AN APPLICATION SERVER ENVIRONMENT

FIELD OF THE INVENTION

The present invention relates to data caching and more particular to data caching for streamed output from component objects in an application server environment.

BACKGROUND OF THE INVENTION

A request sent from a web client (such as a web browser) is received by a web server. The web server then passes the request to an application server which processes the request, calculates the results, and streams the results back to the web server for display. Web/application servers cache output as a function of the input (parameters in the request). These servers typically cache an entire page of data.

Data is cached so that the processing does not have to be repeated for every request for the same page of data. When caching is implemented, some processing is performed and the results are cached for some period of time. Any subsequent requests that match some criteria for the cached data result in the web server streaming the output that has been stored in the cache rather than to re-calculate it. In large applications, it is sometimes necessary to cache components contained within the page rather than the entire page. This allows a page to have components that expire at different times, such that only these components are recalculated for the next request for that page.

The Netscape Application Server, NAS, (also called KIVA Enterprise Server), of Netscape Corporation of Mountain View, Calif., has been used here to compute stream out the dynamic components of a Web page. In Kiva, component objects to stream data have been written using Kiva's AppLogic class. Kiva provides an application programming interface (API) that provides a set of programming instructions that accomplish a well-defined, modular task within the application. In order to process multiple components within a page of data, each component makes a new request to the application server. Each new request requires a new thread and generates all the objects to execute, which consumes valuable system resources. KIVA provides a caching technique to cache each request.

A disadvantage of using the Kiva Enterprise Server caching technique is that every new request needs to be sent to the application server. This results in a greater amount of overhead as there is a high cost associated with starting out a new request. Thus, if a given page contains five different components, the server will process this as six separate and full requests (the page plus the first components) and each request would carry with it the high cost of starting out a new request. Also in this solution, the new request which is being cached needs to be specially programmed to activate the caching. This becomes a maintenance problem as every object that uses caching must be examined, in order to modify it.

SUMMARY OF THE INVENTION

A method and system of streaming a page of data are described. In one embodiment, an object corresponding to the page of data is allocated. The object is executed. If the object is a proxy, then the proxy is executed. If the object is a component, then the component is executed. If the object is a container, then the container is executed.

BRIEF DESCRIPTION OF THE DRAWINGS

The present invention is illustrated by way of example, and not by way of limitation in the figures of the accompanying drawings in which like reference numerals refer to similar elements.

DETAILED DESCRIPTION

Figure 1:
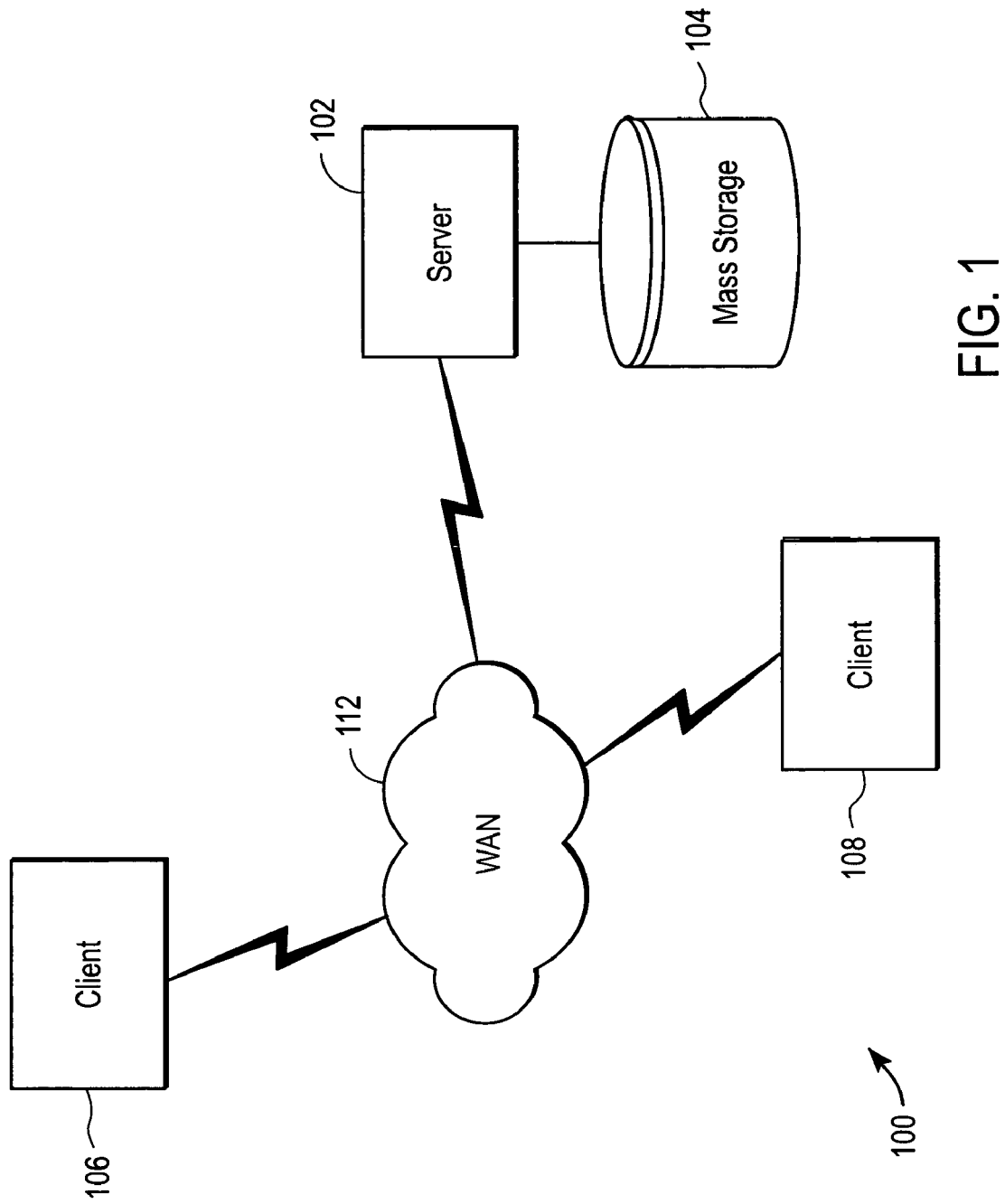
FIG. 1 is an illustration of one embodiment for a distributed object caching system 100.

In one embodiment, objects within a page of data may be written as Java objects. Objects may be components, proxies, or containers of objects. If the page of data has multiple components, the processing costs associated with each start-up are eliminated by processing the caching of the objects in a single request for the page as a whole. A given request is associated with only one start-up expense and all objects are processed during the execution of the request. In one embodiment, a proxy is created in place of the object which executes like the object. At the time the object is to process and stream out its data, the proxy checks input parameters against a cache criteria for the object. If the cache criteria is satisfied and the data is in the cache, the data in the cache is streamed out to the base agent associated with the proxy without creating or processing the object component.

If the cache criteria is satisfied and the data is not in the cache, the proxy creates the object and executes it via a caching base agent. The caching base agent captures all the output from the object associated with the proxy into a buffer. When the object finishes streaming data to the buffer, the caching base agent saves the data to the cache. The proxy then streams out the cache to the associated base agent for the proxy, which in turn streams it out to the requesting web client. In one embodiment, an object may contain any number of nested sub-objects to any number of levels of nesting. The objects and nested sub-objects may be components, proxies, or containers.

In one embodiment, each component is a generic class and not a Kiva Enterprise Server specific AppLogic. The components are not coded in any special manner in order that they may be implementation independent. The component caching may be actuated externally to the component without changes to the component objects.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following detailed description, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented it as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is an illustration of one embodiment for a distributed object caching system 100. Referring to FIG. 1, server 102 is connected to mass storage device 104. Server 102 and mass storage device 104 are connected via wide area network (WAN) 112 to a variety of clients 106 and 108. Wide area network 112 may be connected to any of a variety of clients 106 and 108.

In one embodiment, a user at client 106 requests a page of data represented by a universal resource locator (URL) from server 102. The request is transmitted via WAN 112 to server 102. Server 102 creates an occurrence of a base agent associated with the page of data and processes the execute method of the occurrence of the base class. The execute method of the base class allocates an object, which may be a component, a proxy, or a container. The execute method of the object is then called. If the object is a component, then it calculates the result and streams out the result to the associated base agent. If the object is a proxy, then it checks the cache to see if the request meets the cache criteria. If the criteria is met, and if the result exists in cache, then the proxy streams out the cache entry to the associated base agent. If entry is not in the cache, then the underlying object associated with the proxy is executed, using a caching base agent. The caching base agent captures all the output of the underlying object and saves the output into the cache. The cache entry is then streamed out to the associated base agent by the proxy which in turn streams it out to the web client. If the object is a container it generates all the objects contained within the container in which each object may be a component, container, or a proxy.

In one embodiment, the output of each object may be cached in mass storage 104. If caching is not required for the class or type of object, then the process is as described above. However, if caching is required for the class of object, the stored data for the object is retrieved from the cache and streamed out. If the data is not in the cache, the object creates a cache entry for the data and streams the output to a buffer within mass storage 104. Once the object completes streaming the output to the buffer, the output is saved into the cache and streamed out.

Figure 2:
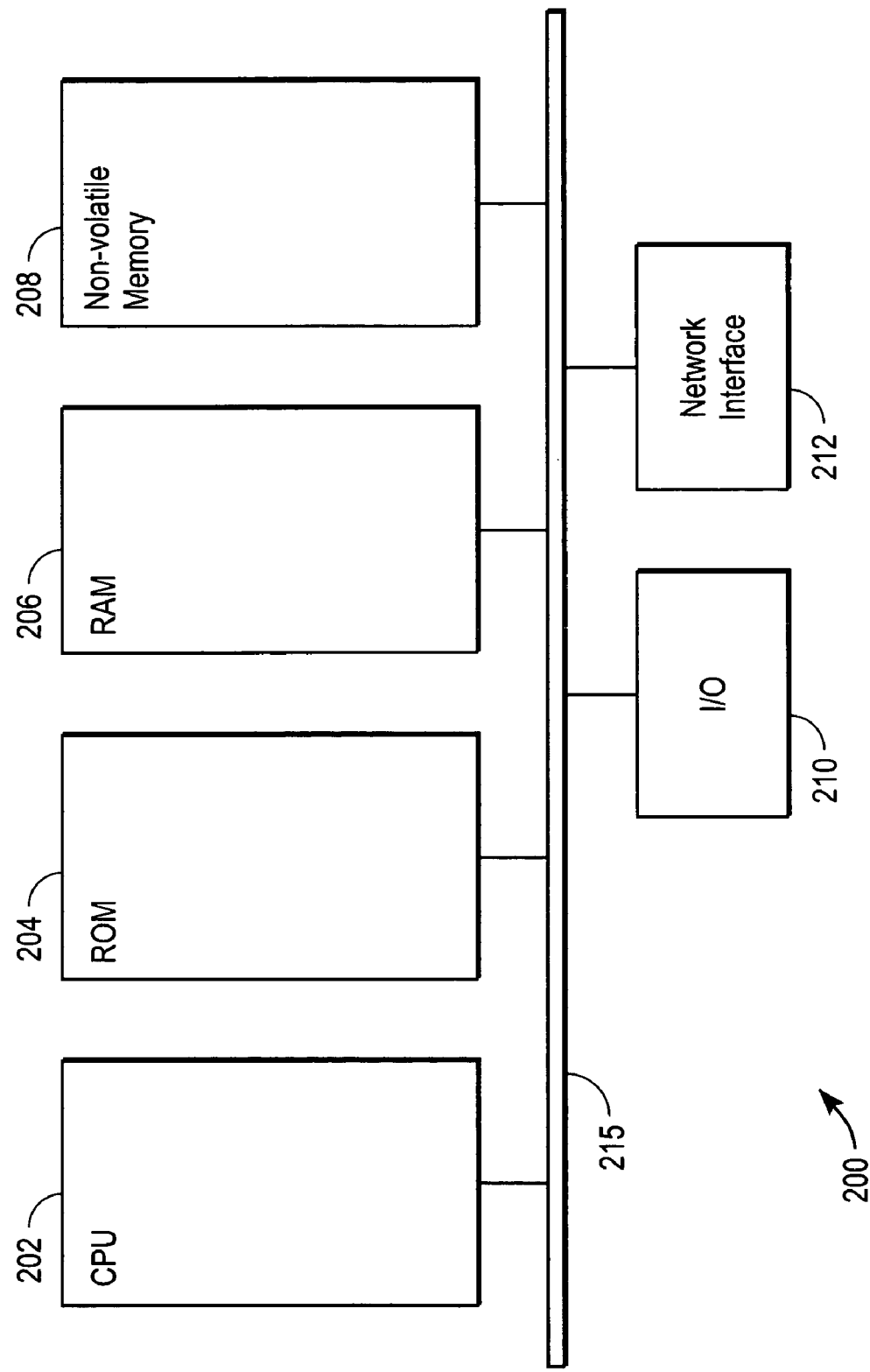
FIG. 2 is a block diagram of one embodiment for an architecture for a computer system.

FIG. 2 is a block diagram of one embodiment for an architecture for a computer system 200. Referring to FIG. 2, CPU 202 is connected via bus 215 to a variety of memory structures and input/output 210. The memory structures may include, for example, read only memory (ROM) 204, random access memory (RAM) 206, and/or non-volatile memory 208. In one embodiment, CPU 202 is also connected via bus 215 to network interface 212. Network interface 212 is used to communicate between computer system 200 and server 102 and a variety of other computer terminals 108. Network interface 212 is connected to the wide area network 112 by any of a variety of means such as, for example, a telephone connection via modem, a DSL line, or the like. The architecture shown in FIG. 2 may be utilized for either clients 106, 108, server 102, or both.

Figure 3:
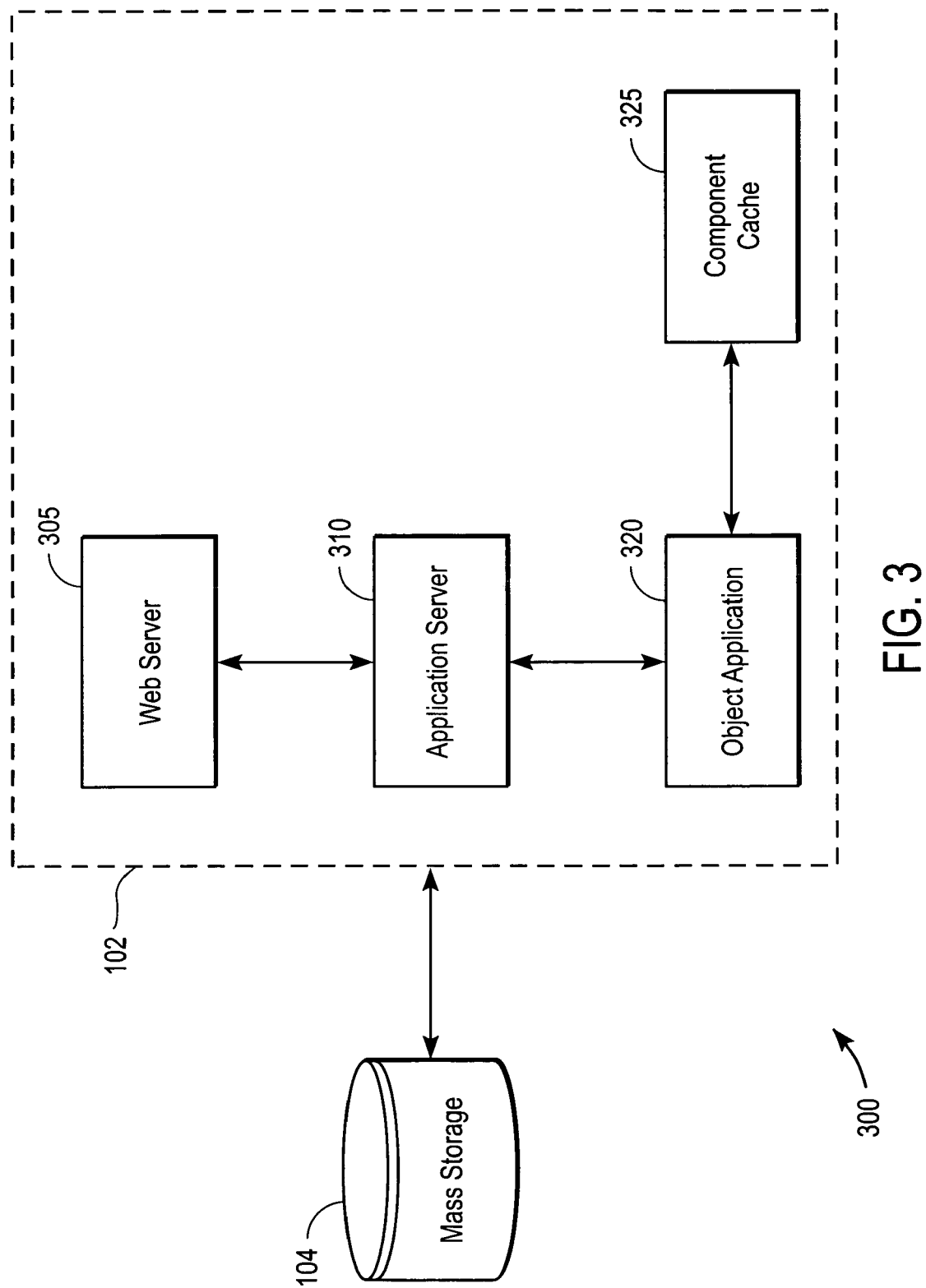
FIG. 3 is a block diagram of one embodiment for an object caching server.

FIG. 3 is a block diagram of one embodiment for an object caching server 300. Referring to FIG. 3, caching server 300 includes mass storage 104 and server 102. In one embodiment, server 102 includes web server 305, application server 310, and object application 320. Web server 305, application server 310, and object application 320 may be maintained within a single server 102 as shown or may be maintained within separate servers. Object application 320 has an associated component cache 325. In one embodiment, component cache 325 is maintained within mass storage device 104. In alternate embodiments, component cache 325 may be maintained within a separate storage devices.

A Uniform Request Locator (URL) request for a page of data is received via the web server 305 at application server 310. In one embodiment, application server 310 transfers control to object application 320 by creating an occurrence of a base agent associated with the URL page and processes the execute method of the occurrence of the base agent. The execute method of the base agent determines which object is associated with the URL page and allocates an instance of the object. The execute method of the base agent passes input parameters to the object. In one embodiment, if the object is a container, the instance of the container determines all of the objects contained within the container and allocates an instance of each object.

The execute method of the object is processed in order to calculate and stream output. The container calls the execute method of each of its objects in order that each object calculates and streams out its own data. If the object is a component, its output is streamed to the base agent. If the object being processed is a proxy, the proxy is processed in place of the component. The proxy determines whether the input parameters for the underlying object match specified cache criteria for the type of the object. If the input parameters match the cache criteria, component cache 325 is checked to see if there is an entry within component cache 325 corresponding to the input request. If a non-empty cached entry is found, the data of the entry is streamed out by the proxy to the base agent for the page. Thus, a previous entry matching cache criteria for the object and current arguments is found in the component cache 325 and is streamed out by the proxy without creating or executing the underlying object. If an empty entry is found (another thread is calculating data for this entry) "Data unavailable" is streamed out by the proxy and its execution ends.

If no valid entry was found within component cache 325, an entry may be created. In one embodiment, a cache entry is created if the object class is tagged as allowing data to be cached. The proxy reserves an entry within component cache 325 corresponding to the input parameters and object. The proxy requests object application 320 to initiate an embedded execution of a caching base agent for the target of the object to be cached and object application 320 creates an instance of the caching base agent. The instance of the caching base agent executes the object which streams its output to a buffer. When the object's execution completes, the proxy saves the buffer containing the accumulated output of the object into the reserved entry in component cache 325. After the buffer is saved in component cache 325, data in the entry is streamed to the caching base agent which streams the output to the browser.

Figure 4A:
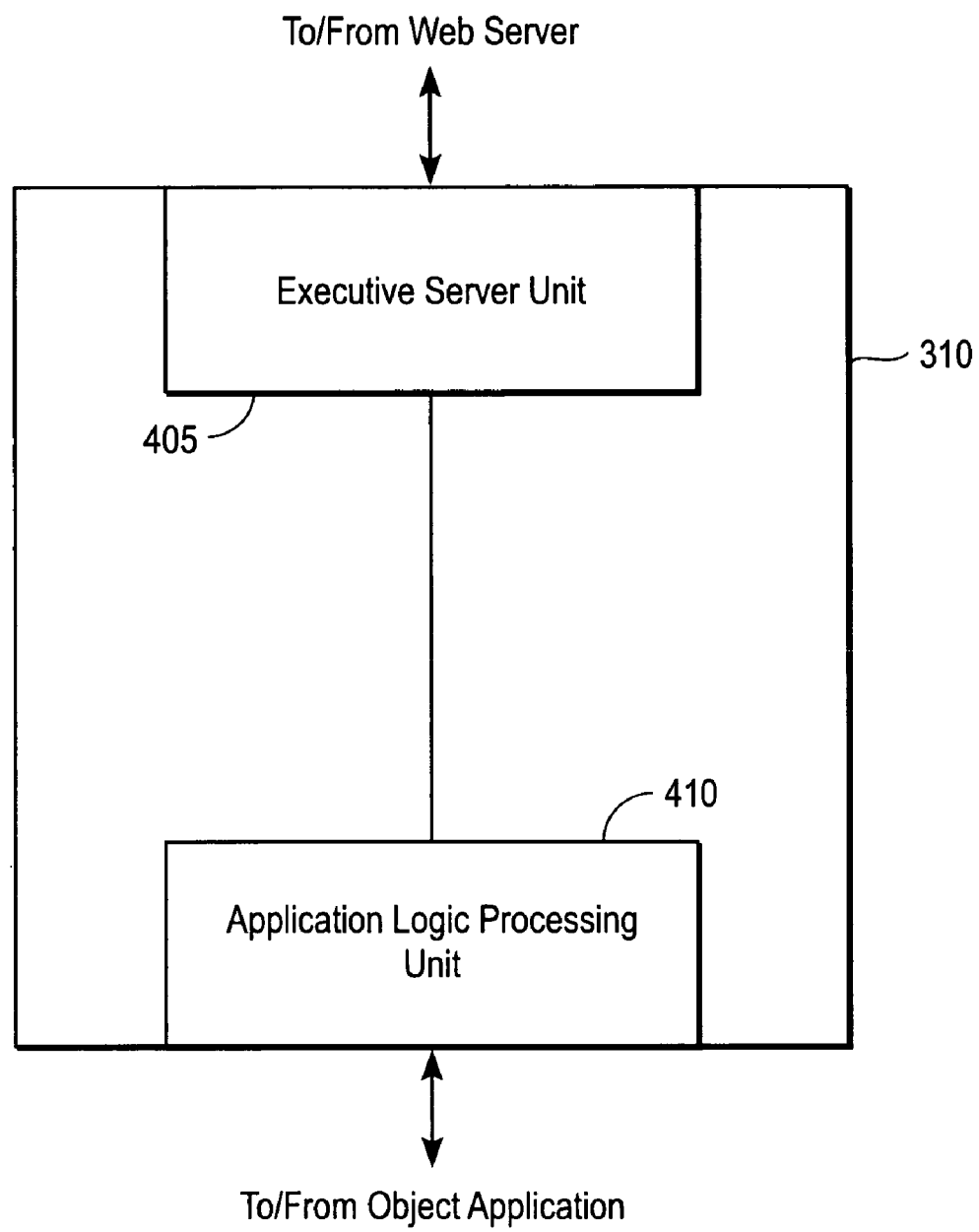
FIG. 4a is a block diagram of one embodiment for an application server.

FIG. 4a is a block diagram of one embodiment for an application server 310. Application server 310 includes executive server unit 405 and application logic processing unit 410. Requests for a page of data invoked by a URL are received from web server 305 at executive server unit 405. Application logic processing unit 410 transfers control for the request of the page of data to object application 320. In addition, application logic processing unit 410 receives the streamed data from object application 320 and transfers the streamed data to web server 305.

Figure 4B:
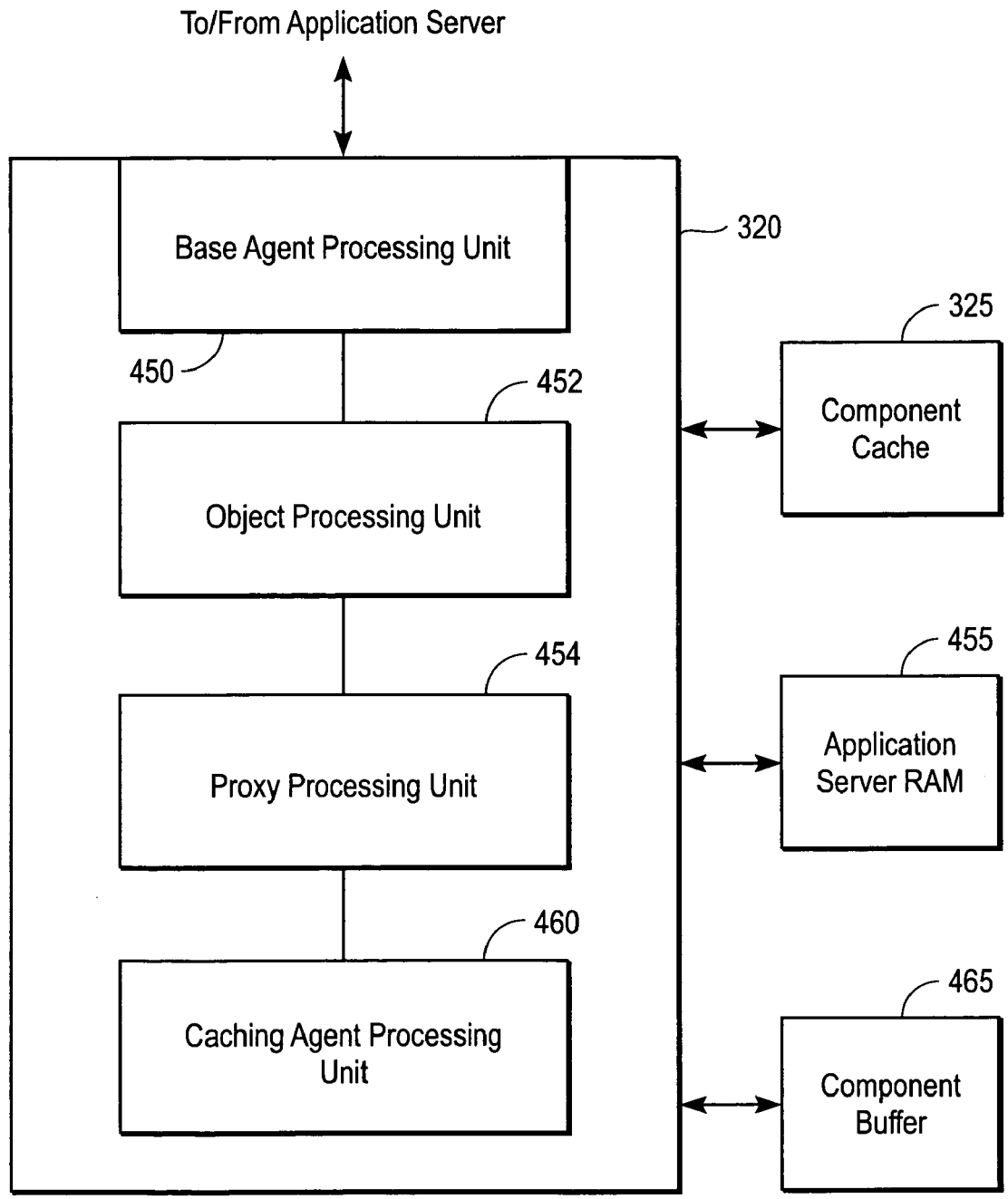
FIG. 4b is a block diagram of one embodiment for an object application.

FIG. 4b is a block diagram of one embodiment for object application 320. Object application 320 includes base agent processing unit 450, object processing unit 452, proxy processing unit 454, and caching agent processing unit 460. In addition, object application 320 may also include application server random access memory (RAM) 455 and caching buffer 465. A request for a URL page is received by application server 310 which creates an instance of base agent processing unit for the URL page. Base agent processing unit 450 processes an execute method of the instance of the base agent. Base agent determines which object is associated with the URL page and creates the object for the URL page. In one embodiment in which the object is a container, base agent processes the execute method of the container which creates all the objects associated with the container. After creating all the instances of the objects associated with the container, object processing unit 452 processes the execute method for each of the objects. Each instance of the object associated with the container calculates its own output to stream out to the base agent processing unit 450. Normally the execute method of the object calculates the output to stream out and calls a stream result method of object processing unit 452. The stream result method is a component of an object which passes the stream data to the associated base agent which passes the stream data to the browser via the application server 310 and web server 305. The implementation of the stream result method within the object obtains a reference to the instance of the underlying base agent created by the application server. Each object of the container streams out data as a function of its input and/or the environment.

An object's output may be cached as an independent cache entry within component cache 325. If an object is to be cached, the container inserts a proxy in place of the object within the processing stream. For any object that may be a candidate for caching, a proxy is created in place of the object. When the execute method of a container is processed, the execute method of each of the objects is processed to stream out its data. When the object that is being represented as a proxy is executed, the execute method of the proxy is processed by proxy processing unit 454. When the proxy's execute method is processed, it first determines if the object's input parameters match cache criteria for the object. If the cache criteria is met, the proxy determines whether an entry already exists in component cache 325 for the object. If a non-empty entry already exists, the proxy streams the data from component cache 325 to the base agent processing unit 450. If an empty entry is already reserved for the object, an error message is sent as output notifying the user that the data for the object is unavailable. However, if the entry does not exist, a new entry is created in the component cache 325 by the proxy.

The proxy then creates an embedded execution of a caching base agent. The instance of the caching base agent creates an entry in caching buffer 465 to receive the output from the object represented by the proxy. Caching base agent creates and executes the object represented by the proxy. As the object streams data to its caching base agent, caching agent processing unit 460 captures the output from the object and appends it to caching buffer 465. After the execution of the object is complete, caching agent processing unit 460 transfers the information in caching buffer 465 to the previously created entry in component cache 325. Control then returns to proxy processing unit 454 which retrieves the just-created entry in component cache 325 and streams the data to base agent processing unit 450. As the container and all its components stream data to base agent processing unit 450, base agent processing unit 450 streams the data to application server 310 which streams the data to web server 305.

Figure 5:
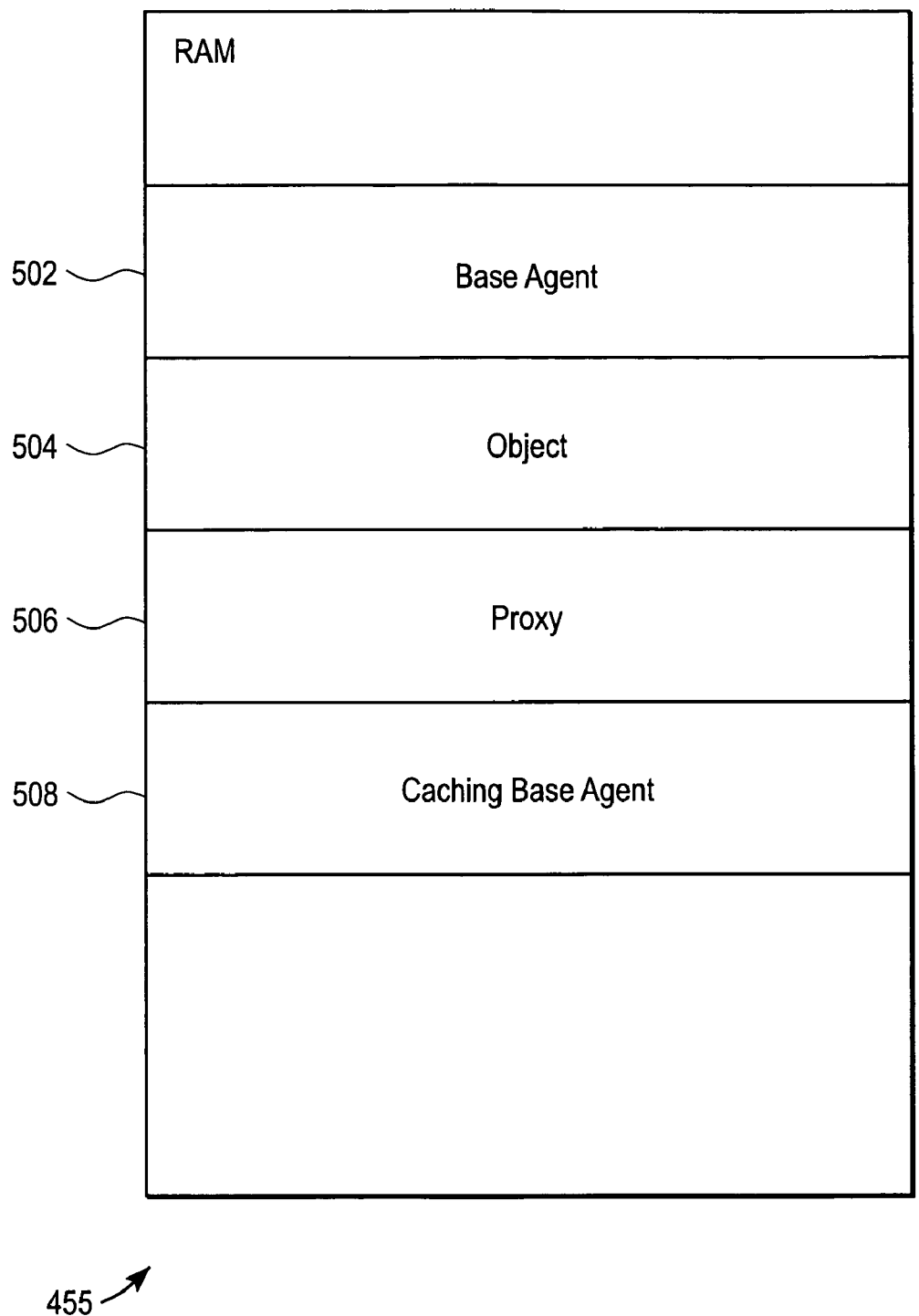
FIG. 5 is a block diagram of one embodiment for random access memory of the object application of FIG. 4b.

FIG. 5 is a block diagram of one embodiment for random access memory (RAM) 455 of object application 320. Referring to FIG. 5, RAM 455 includes base agent 502, object 504, proxy 506, and caching base agent 508. Base agent 502 streams the output for a page of data to base agent processing unit 450 and creates the object for the page. Object 504 streams the output results for the object (which could be a container) to application server 310 and web server 305. Proxy 506 executes the proxy substituted for an object and calls caching base agent 508. Caching base agent 508 executes object which streams data to caching base agent which streams data to buffer 465. Finally, when object execution completes, caching base agent transfers the streamed data from buffer 465 to component cache 325.

Figure 6:
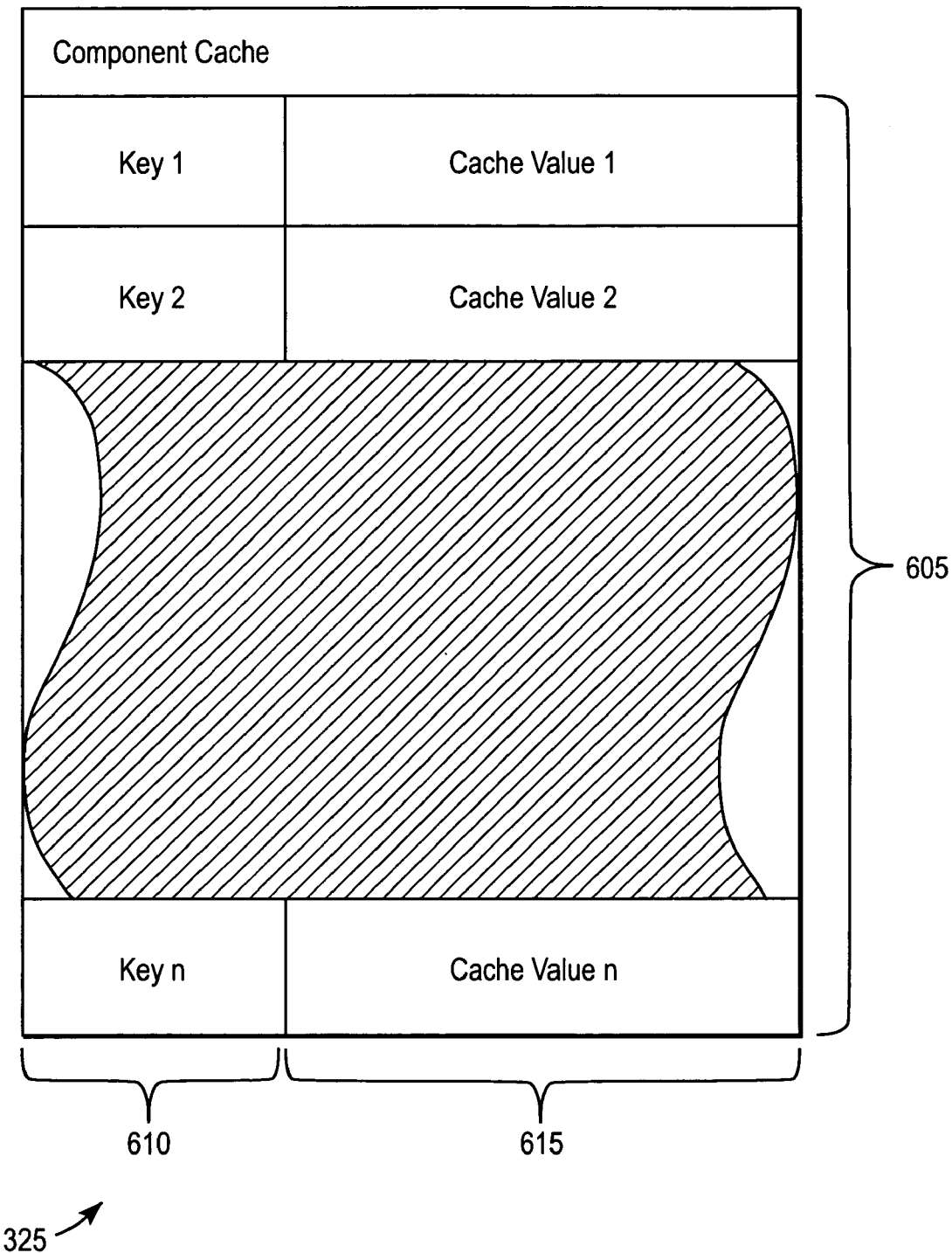
FIG. 6 is a block diagram of one embodiment for a component cache of FIG. 3.

FIG. 6 is a block diagram of one embodiment for component cache 325. Referring to FIG. 6, component cache 325 includes a number of component cache entries 605. Each component cache entry 605 includes key 610 and cache value 615. In one embodiment, key 610 is a concatenation of the name of an object being cached and the input parameters relevant to the cache criteria for the particular cache entries 605. The concatenated string is converted to a hash value in order to create key 610. Cache value 615 is the streamed output data created by an instance of a proxy associated with a particular object as it was executing the specific parameter values.

Keys 610 are created by a concatenation of the cache criteria, which specifies the conditions under which caching is performed for an object, and the object name. Cache criteria may be developed for each type or class of object that is susceptible to caching. In one embodiment, in order to activate the object class, information is entered as to the length of time the information is to be maintained in the cache 325 and under what conditions the caching is to take place. An entry may be maintained in the cache for a specific period of time or may be maintained indefinitely. For example, an object may be cached for a set period of time such as 60 seconds. When the object is first executed, the execute method of the object will be processed and its output will be saved in the cache. The key value created for the cached entry will be removed from the cache by a separately running program 60 seconds after the entry has been created. Prior to removal, any other request that matches a specific object and satisfies the cache criteria will stream the cache value from the cache 325 directly. After the cached entry has been removed, the first request matching the cache criteria will result in a new entry being created in cache 325.

In one embodiment, the following conditions may be specified for a given class object. First, the condition that no special conditions should be satisfied in order for the object to be cached. This results in the object being cached regardless of any values of the input parameters. Second, the argument value condition indicating a parameter and a value for the parameter which specifies that caching is to be performed only when the specified parameter exists in the set of input parameters and its value matches the value specified. If the value specified is a star (*) or any other symbol designated for this purpose, then any input value matches the parameter. Otherwise, the value must be specified and it must match the value of the parameter exactly. For example, if the conditions specified is "input-param,def", then caching would be performed if the set of input parameters contains the parameter whose name is "input-param" and the value of this parameter is "def". In this example, the output will be cached with the key representing the name of the object concatenated with the matching value "def". If the cache criteria used is "param1,*" then caching is performed if the parameter "param1" exists in the set of input parameters. Since this parameter may have different values for different invocations, each invocation looks up the key made by the concatenation of the name of the object and the current value of the parameter "param1" with special symbol such as ";" used as separator. For example, if the first invocation of this object named "sub" specifies "param1=A", this matches the criteria "param1=*" and an entry matching the key "sub;A" is created in the cache, "sub" is executed and its output is saved to the entry whose key is "sub;A". During the "lifetime" of this entry, if other requests are made for component "sub", one which specifies "param1=B" and the second specifies "param1=A", the first request will result in executing the object and the output saved in an entry whose key is "sub;B" and the second request will result in the output streamed from the entry which is already in the cache whose key is "sub;A".

Another type of condition may specify that caching should be performed if a parameter exists in the set of input parameters whose name is "argument" and contains a value which is one of several possibilities such as "value 1", "value 2", "value 3". Any of the values specified in the condition may match the criteria. Thus, this condition may specify, for example, "shape, triangle, circle", which means that caching will occur when the value of the "shape" parameter is either "triangle" or "circle". If an invocation of this object contains the parameter "shape" with the value of "square", no match is made for this criteria and output will not be cached. In addition, any of the conditions described above may be combined to form a variety of cache criteria.

Figure 7:
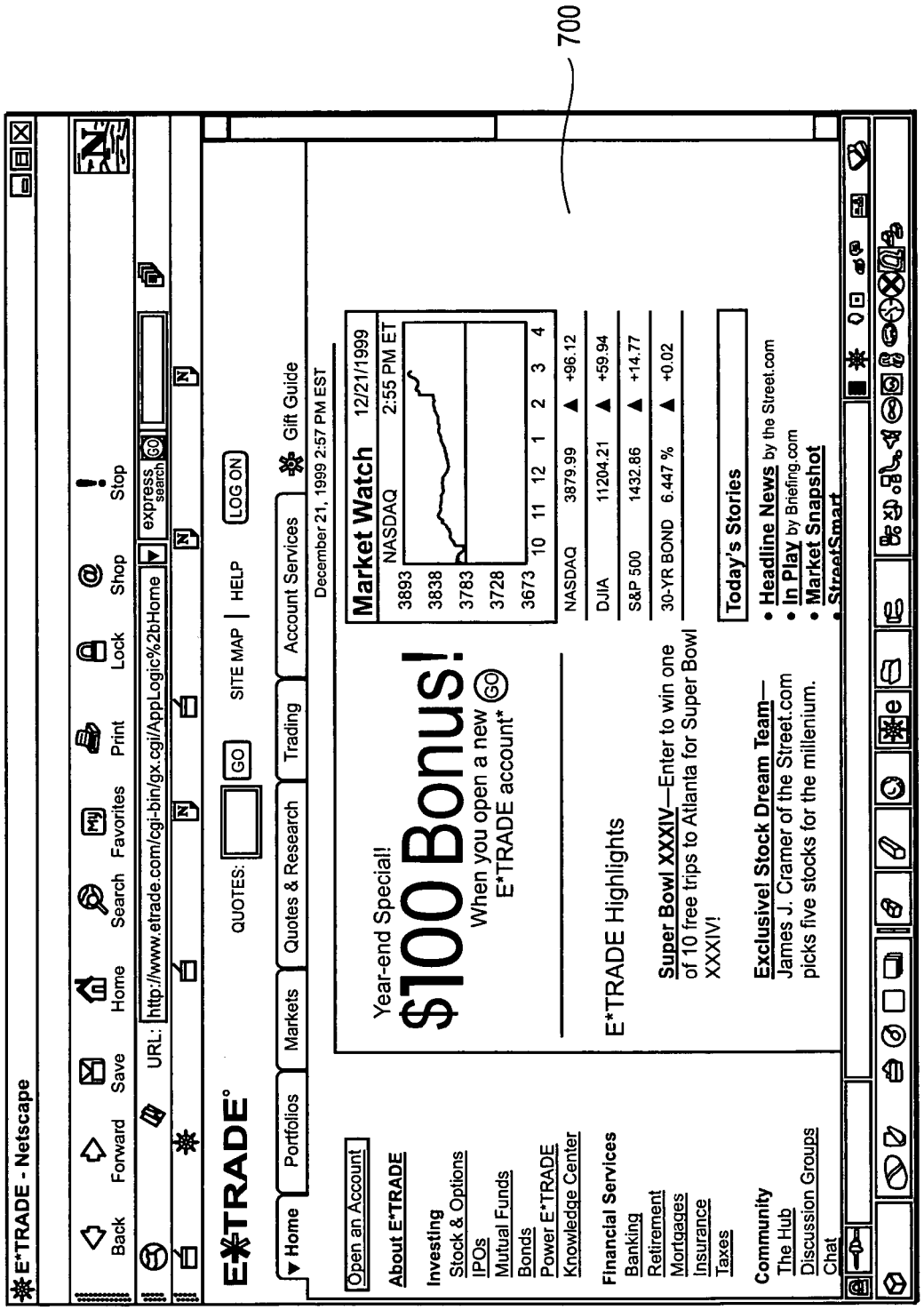
FIGS. 7–10 illustrate exemplary user input and modification windows.

FIG. 7 is an exemplary user input and modification window. Referring to FIG. 7, window 700 is displayed when a user initially signs onto the "Etrade" site.

Figure 8:
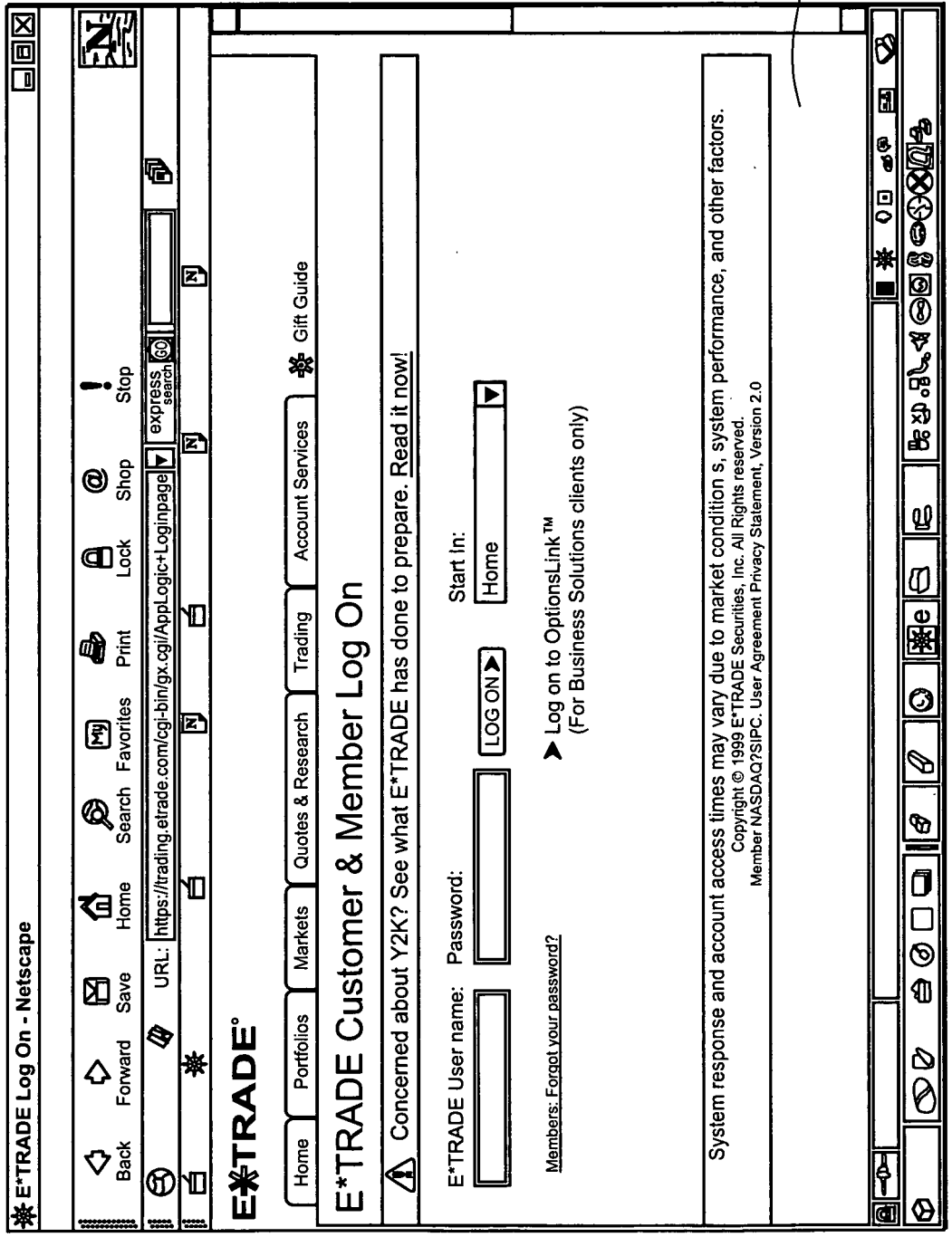

FIG. 8 illustrates an exemplary user input and modification window 800. Referring to FIG. 8, window 800 is displayed for the user to enter a user name and password in order to access certain areas of the "Etrade" site.

Figure 9:
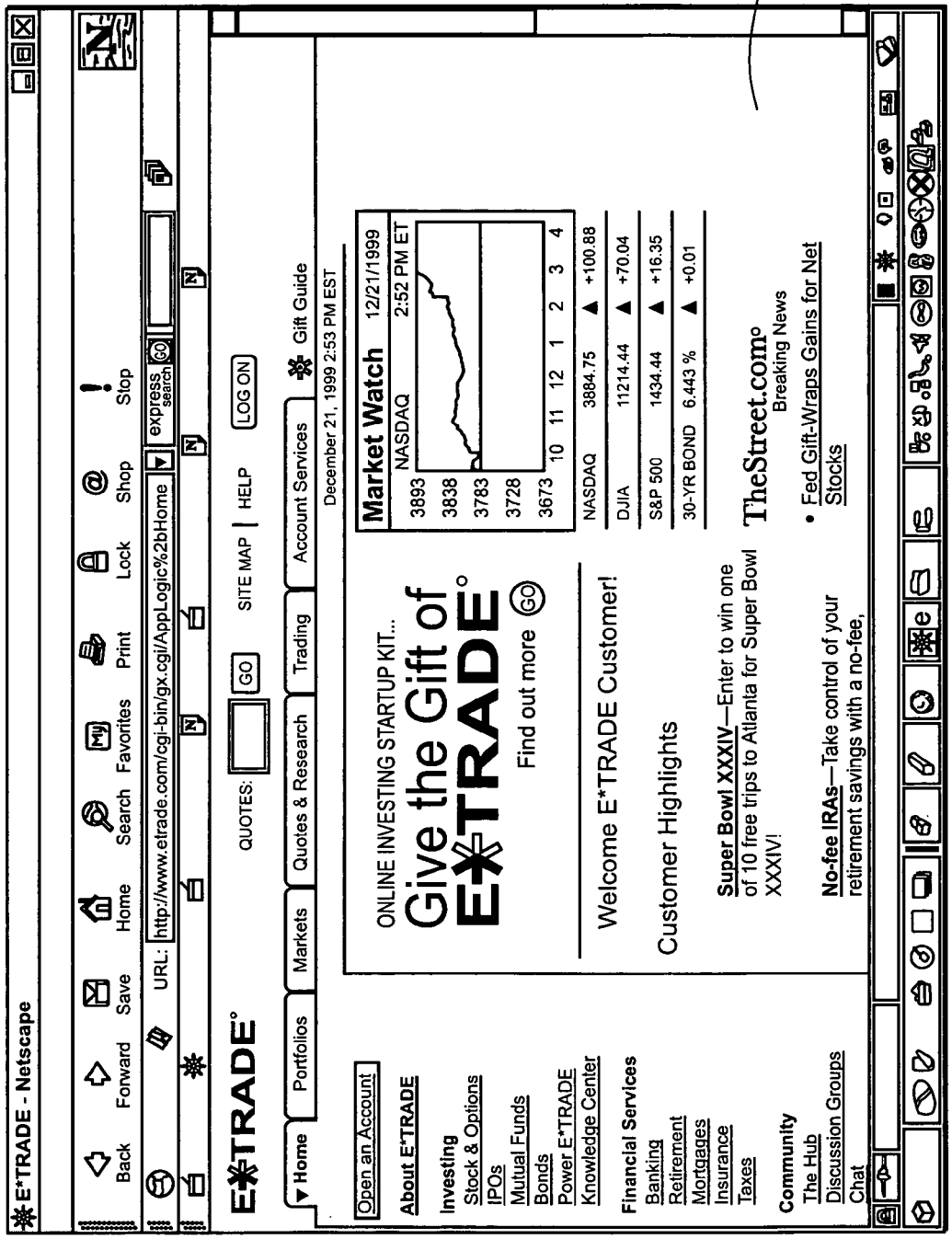

FIG. 9 illustrates an exemplary user input and modification window 900. Referring to FIG. 9, window 900 is displayed after the user initially signs on to the site using his or her user name or password and is taken to the home page of the site.

Figure 10:
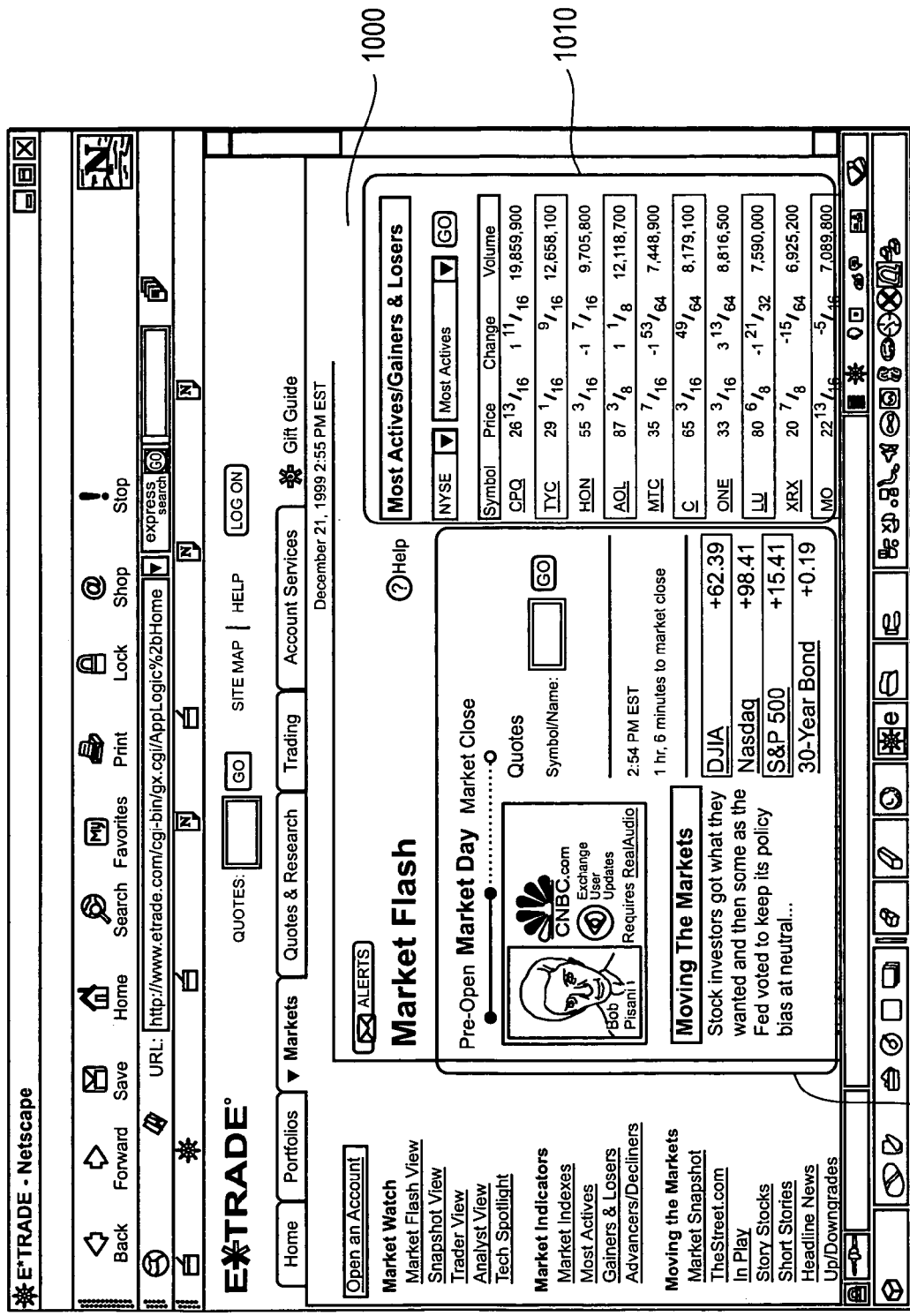

FIG. 10 illustrates an exemplary user input and modification window 1000. Window 1000 is displayed when the user enters the market section of the Etrade site. Within window 1000, the most active gainers and losers area 1010 is displayed. The most active gainers and losers area 1010 is a component (object) of the page of data as illustrated by FIG. 10. In addition, the window 1010 also includes a news area 1020. Both news area and most active gainers and losers are independent components of the page of data and are created by the method and system as described above.

Figure 11:
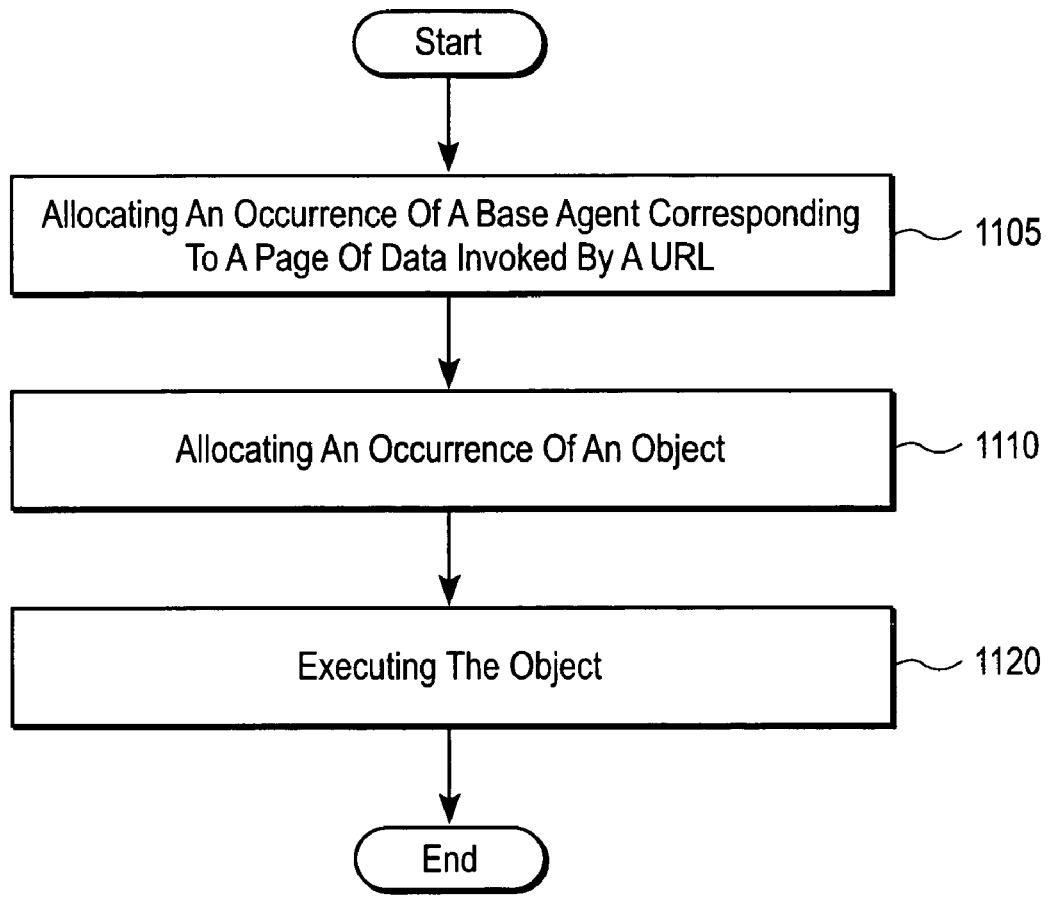
FIG. 11 is a flow diagram of one embodiment for streaming object data for a page of data invoked by a uniform resource locator (URL)

FIG. 11 is a flow diagram of one embodiment for streaming object data for a page of data invoked by a uniform resource locator (URL). Initially at processing block 1105, an instance of base agent 502 corresponding to the page of data is allocated. The instance of base agent 502 is associated with the page of data. The execute method of base agent 502 is processed.

At processing block 1110, an instance of an object associated with the page of data is allocated for base agent 502. In addition, the object obtains a reference to the base agent which allocated the object. In one embodiment, the object may be a component, a proxy, or a container. The execute method of the instance of the base agent 502 determines which object is associated with the page of data and creates the appropriate object. If a proxy is created, the proxy receives the name of the underlying object for which it acts as a proxy.

Figure 12:
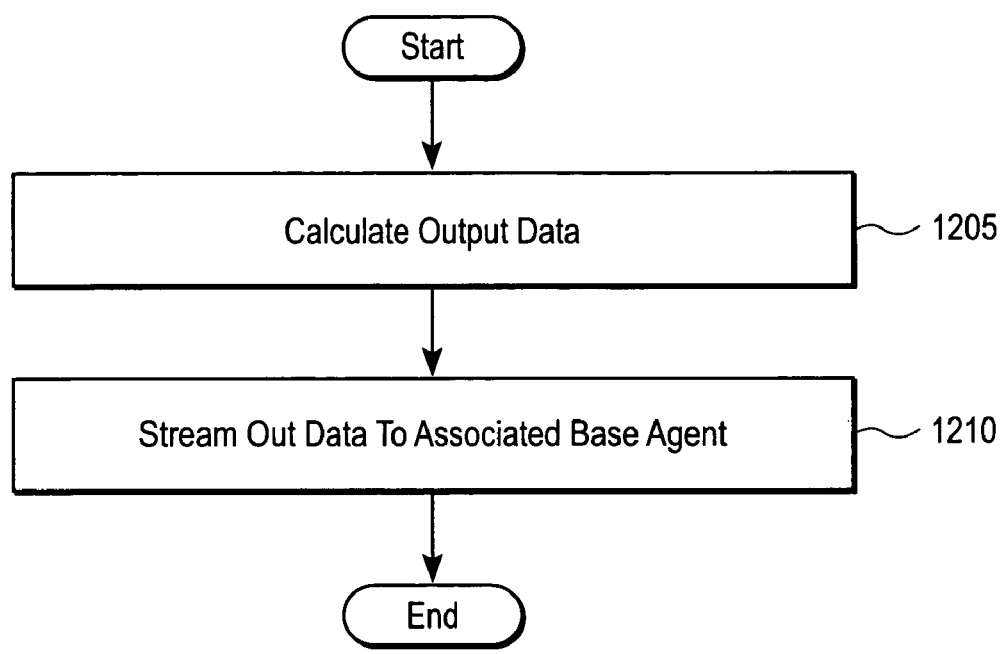
FIG. 12 is a flow diagram of one embodiment for streaming data for a component.
Figure 13:
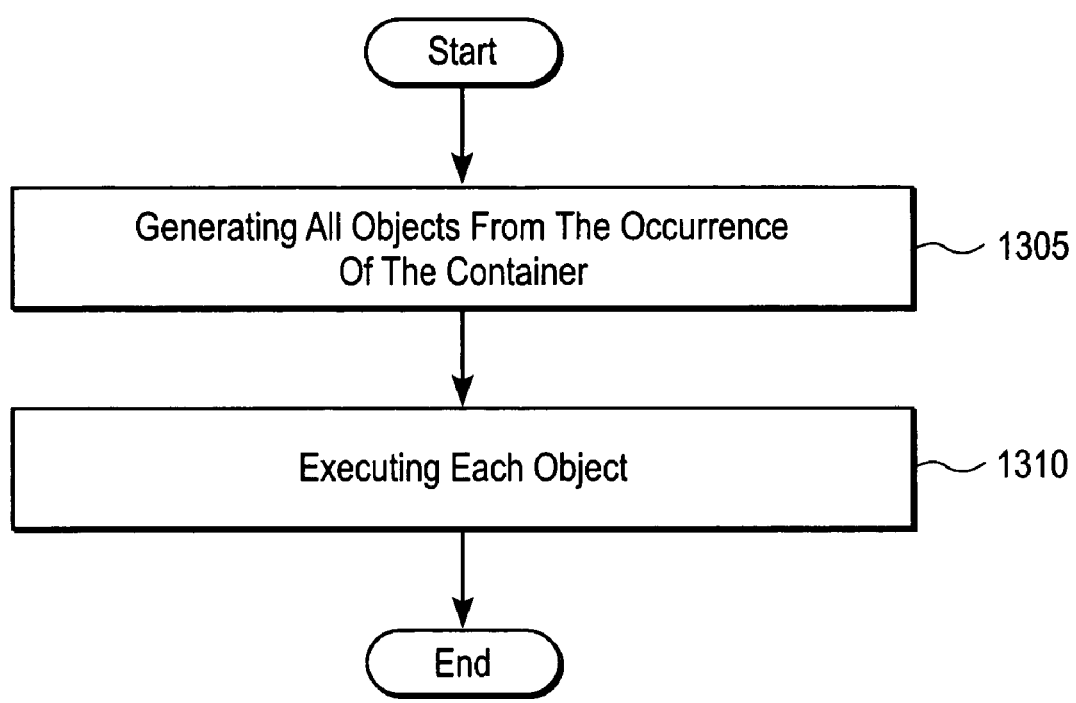
FIG. 13 is a flow diagram of one embodiment for streaming data for a container.
Figure 14:
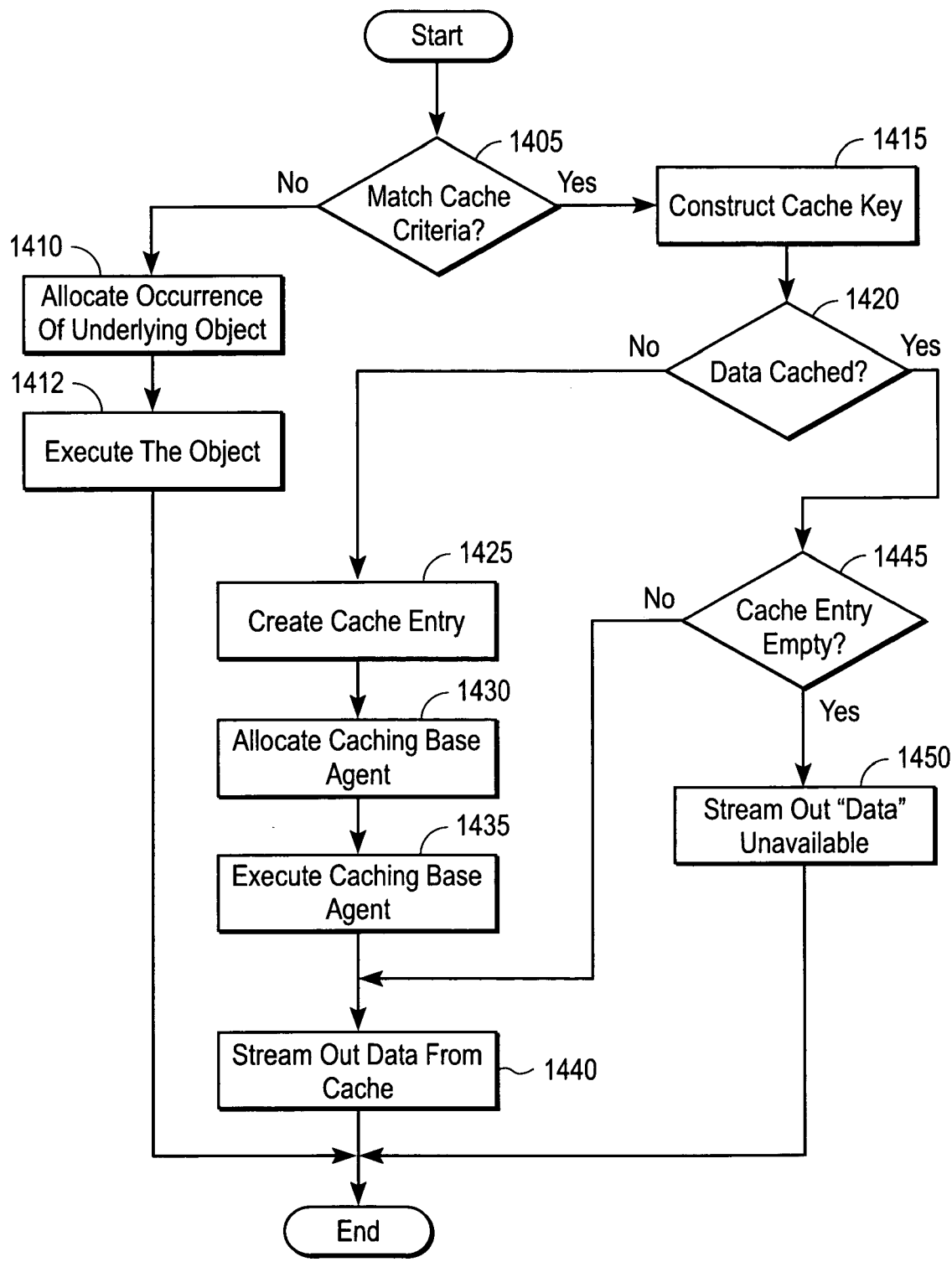
FIG. 14 is a flow diagram of one embodiment for streaming data for a proxy.

At processing block 1120, the execute method of the instance of the object is processed. The object execute method determines the output data to be streamed out to the base agent 502. If the object is a component, the processing blocks of FIG. 12 are processed. If the object is a container, the processing blocks of FIG. 13 are processed. If the object is a proxy, the processing blocks of FIG. 14 are processed.

FIG. 12 is a flow diagram of one embodiment for streaming data for a component. The processing blocks of FIG. 12 are executed if the object executed at processing block 1120 of FIG. 11 is a component. Initially at processing block 1205, the component calculates its output.

At processing block 1210, the component streams its output data to its associated base agent. Each instance of the component contains a reference to the associated base agent created in processing block 1105 of FIG. 11. To stream its output, the component calls a stream result method of that base agent. A stream result method in the base agent streams the output data to the web browser. A stream result method in the caching base agent, on the other hand, captures this output data in a buffer as described in reference to FIG. 15.

FIG. 13 is a flow diagram of one embodiment for streaming data for a container. The processing blocks of FIG. 13 are executed if the object executed at processing block 1120 of FIG. 11 is a container. Initially at processing block 1305, the execute method of the container generates all the objects associated with and contained within the instance of the container. The objects may be components, proxies, or containers. The execute method of the container determines the objects associated with the container and creates an instance of every object for the container.

At processing block 1310, after creating all the instances for the objects, the container processes the execute method for each of the objects created. The objects may be components, proxies, or containers. If the object generated is a component, the processing blocks of FIG. 12 are processed. If the object generated is a container, the processing blocks of FIG. 13 are processed. If the object generated is a proxy, the processing blocks of FIG. 14 are processed.

FIG. 14 is a flow diagram of one embodiment for streaming data for a proxy. Initially at processing block 1405, it is determined whether the input parameters for the proxy match the cache criteria for the underlying object. Every proxy contains the name of its underlying object. If there is no match, processing continues at processing block 1410. If there is a match, processing continues at processing block 1420.

If the cache criteria is not satisfied at processing block 1405, at processing block 1410, the underlying object for the proxy is allocated. In one embodiment, the object may be a component, a proxy, or a container. The execute method of the proxy determines which object is allocated based on the name passed to it in processing block 1110 of FIG. 11.

At processing block 1412, the execute method of the underlying object is processed. The object execute method determines the output data and streams it out to the associated base agent for the object. If the object is a component, the processing blocks of FIG. 12 are processed. If the object is a container, the processing blocks of FIG. 13 are processed. If the object is a proxy, the processing blocks of FIG. 14 are processed.

If the cache criteria is satisfied at processing block 1405, at processing block 1415, a cache key is constructed from the underlying object name and current parameter values that matched the cache criteria.

At processing block 1420, it is determined if an entry exists for the cache key within component cache 325. If the cache entry exists, processing continues at processing block 1445. If the cache entry does not exist, processing continues at processing block 1425.

At processing block 1425, an entry corresponding to the cache key is created in the component cache 325. In one embodiment, proxy 506 adds a parameter to the current parameters of the current request. This parameter's value contains the key for which an entry has just been created in the cache and reserves an entry in the cache 325.

Figure 15:
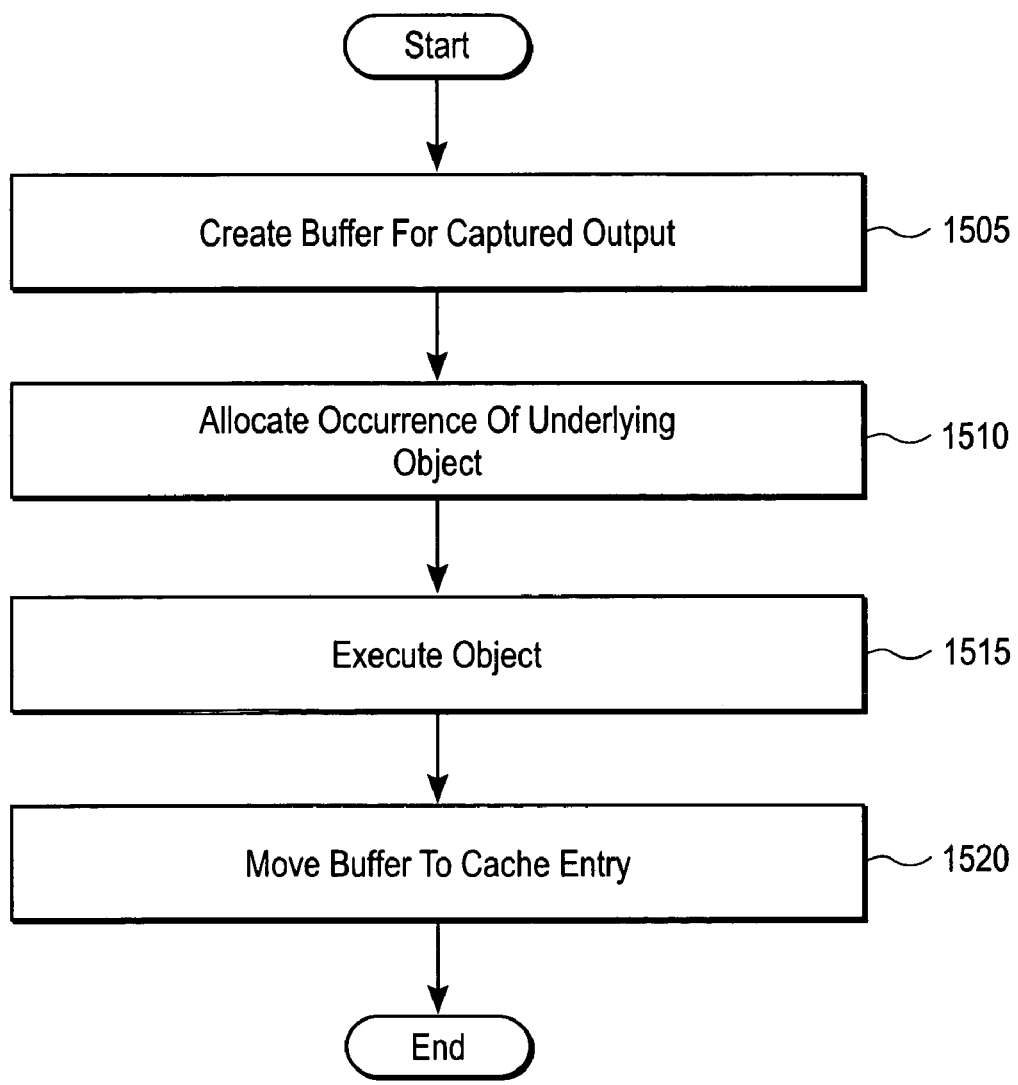
FIG. 15 is a flow diagram of one embodiment for caching output data from an object associated with a proxy.

At processing block 1430, proxy 506 creates an instance of the caching base agent 508. At processing block 1435, the instance of caching base agent 508 is executed for the object associated with the proxy. Processing blocks 1505 through 1520 of FIG. 15 are processed to execute the base agent which creates the output data of the object within the component cache 325.

At processing block 1440, the cache value of the entry associated with the object is streamed from component cache 325 to the associated base agent which streams out the data and processing of the flow diagram of FIG. 14 ends.

If at processing block 1420 it is determined that a cache entry already exits for the cache key constructed in processing block 1415, at processing block 1445 it is determined if the cache entry is empty. If the entry is empty, processing continues at processing block 1450. If the entry is not empty, processing continues at processing block 1440.

At processing block 1450, if a blank entry already exits in component cache 325 for the object, the object output is being cached by another thread. In this case, the object streams out "data unavailable" to the associated base agent for the object.

FIG. 15 is a flow diagram of one embodiment for caching output data from an object associated with a proxy. Initially at processing block 1505, a buffer is created for capturing output data from the execution of the associated object.

At processing block 1510, an occurrence of the associated object is allocated. In one embodiment, the object may be a component, a proxy, or a container. The execute method of the instance of the base agent 502 associated with the associated object determines which object is allocated. The object is given a reference to this caching base agent.

At processing block 1515, the execute method of the associated object is executed. The object's execute method determines the output data to be streamed out to the associated base agent for the object. As the object streams out its output data to its associated caching base agent, all output for the associated object is captured by the caching base agent and streamed out to the buffer.

At processing block 1520, after the execution of the associated object completes, the contents of the buffer 465 is transferred to the component cache 325 into the entry whose key is represented by one of the parameters. After the transfer of the data from buffer 465 to component cache 325 is complete, processing continues at processing block 1440 of FIG. 14.

Several embodiments in the implementation of the streaming of a page of data have been described. The specific arrangements and methods described here are merely illustrative of the principles of this invention. Numerous modifications in form and detail may be made by those skilled in the art without departing from the true spirit and scope of the invention. Although this invention has been shown in relation to a particular embodiment, it should not be considered so limited. Rather it is limited only by the appended claims.

What is claimed is:

1. A computer implemented method of streaming a page of data, the method comprising:
   allocating at least one object corresponding to the page of data, the page of data including one or more sub-components;
   executing the at least one object within a single request to an application server to provide the page, wherein, for each of the one or more sub-components, the executing comprises,
      creating a proxy corresponding to the sub-component, the proxy representing a functionality of an object corresponding to the sub-component,
      having the proxy to return the data corresponding to the sub-component to the at least one object if the corresponding data is in a cache memory without executing the object corresponding to the sub-component in order to obtain the data corresponding to the sub-component,
      if the corresponding data is not in the cache memory, having the proxy to create the object corresponding to the sub-component to execute the object via a container associated with the object to generate the data corresponding to the sub-component, to return the generated data to the at least one object, and to store the data in the cache memory, including
         generating at least one container object from the container, and
         executing the at least one container object, including
            executing a proxy if the at least one container object is a proxy,
            executing a component if the at least one container object is a component, and
            executing a container if the at least one container object is a container; and recursively performing allocating and executing the at least one object to process at least one sub-object contained within the at least one object.

2. The method of claim 1 further comprising recursively performing generating and executing the at least one container object to process at least one container sub-object contained within the at least one container object.

3. The method of claim 1 wherein executing a proxy further comprises:
   determining if a cache entry exists for the occurrence of the at least one object;
   if a cache entry is not found,
      allocating a new cache entry; and
      streaming out a cache entry value.

4. The method of claim 3 wherein determining further comprises:
   matching cache criteria for the cache entry;
   if the cache criteria does not match,
      allocating an underlying object associated with the proxy, and
      executing the underlying object; and
   if the cache criteria matches,
      constructing a cache key.

5. The method of claim 4 wherein constructing a cache key further comprises:
   matching at least one input parameter against at least one cache criteria entry.

6. The method of claim 3 wherein determining further comprises:
   examining the cache using a cache key.

7. The method of claim 3 wherein allocating a new cache entry further comprises:
   creating a new cache entry;
   allocating an occurrence of a caching base agent; and
   executing the caching base agent.

8. The method of claim 7 wherein creating the new cache entry further comprises:
   creating a new key; and
   reserving the new cache entry corresponding to the new key.

9. The method of claim 7, wherein executing the cache base agent further comprises:
   creating a buffer entry to capture output data;
   allocating an underlying object associated with the proxy;
   executing the underlying object to stream out the output data to the buffer entry,
      wherein the executing comprises,
         executing a proxy if the at least one object is a proxy,
         executing a component if the at least one object is a component, and
         executing a container if the at least one object is a container; and
   transferring the buffer entry to the new cache entry.

10. The method of claim 3 wherein determining further comprises:
    determining if the cache entry is empty; and
    streaming out an error message if the cache entry is empty.

11. The method of claim 1 further comprising:
    allocating an occurrence of an associated base agent corresponding to the page of data.

12. The method of claim 11 wherein executing a component further comprises:
    calculating output data for the occurrence of the component; and
    streaming out the data to the associated base agent.

13. The method of claim 12 wherein streaming further comprises calling a stream result method of the associated base agent.

14. The method of claim 12 further comprising creating a reference to the associated base agent within the component.

15. The method of claim 1 wherein the at least one object comprises all components within the page of data.

16. The method of claim 1 wherein the at least one object is an executable object.

17. The method of claim 1 wherein the at least one object is a component, a proxy, or a container.

18. A system for streaming a page of data, the system comprising:
    means for allocating at least one object corresponding to the page of data, the page of data including one or more sub-components;
    means for executing the at least one object within a single request to an application server to provide the page, wherein, for each of the sub-components, means for executing comprises,
       means for creating a proxy corresponding to the sub-component, the proxy representing a functionality of an object corresponding to the sub-component,
       means for having the proxy to return the data corresponding to the sub-component to the at least one object if the corresponding data is in a cache memory without executing the object corresponding to the sub-component in order to obtain the data corresponding to the sub-component,
if the corresponding data is not in the cache memory, means for having the proxy to create the object corresponding to the sub-component, to execute the object via a container associated with the object to generate the data corresponding to the sub-component, to return the generated data to the at least one object, and to store the data in the cache memory, including
generating at least one container object from the container, and
executing the at least one container object, including
executing a proxy if the at least one container object is a proxy,
executing a component if the at least one container object is a component, and
executing a container if the at least one container object is a container; and
recursively performing allocating and executing the at least one object to process at least one sub-object contained within the at least one object.

19. An article of manufacture including one or more computer-readable media with executable instructions therein, which, when executed by a processing device causes the processing device to:
allocate at least one object corresponding to the page of data, the page of data including one or more sub-components;
execute the at least one object within a single request to an application server to provide the page, wherein, for each of the one or more sub-components, the executing comprises,
create a proxy corresponding to the sub-component, the proxy representing a functionality of an object corresponding to the sub-component,
have the proxy to return the data corresponding to the sub-component to the at least one object if the corresponding data is in a cache memory without executing the object corresponding to the sub-component in order to obtain the data corresponding to the sub-component,
if the corresponding data is not in the cache memory, have the proxy to create the object corresponding to the sub-component, to execute the object via a container associated with the object to generate the data corresponding to the sub-component, to return the generated data to the at least one object, and to store the data in the cache memory, including
generating at least one container object from the container, and
executing the at least one container object, including
executing a proxy if the at least one container object is a proxy,
executing a component if the at least one container object is a component, and
executing a container if the at least one container object is a container; and
recursively performing allocating and executing the at least one object to process at least one sub-object contained within the at least one object.

20. A system for streaming a page of data, the system comprising:
a base agent processing unit to allocate at least one object corresponding to the page of data within a single request to an application server to provide the page, the page of data including one or more sub-components;
an object processing unit to execute the at least one object if the at least one object is a component to perform a task of the component and to execute each of the sub-objects contained within the at least one object if the respective object is a container; and
a proxy processing unit to execute the at least one object if the at least one object is a proxy, wherein for each of the sub-components, the proxy processing unit returns data corresponding to the sub-component to the base agent processing unit from the cache memory if the corresponding data is in the cache memory without executing the object corresponding to the sub-component in order to obtain the data corresponding to the sub-component, and wherein if the data is not in the cache memory, the proxy processing unit creates an object corresponding to the sub-component and invokes the object processing unit to execute the object to generate output data, returns the output data to the base agent processing unit, and stores the output data in the cache memory, including
generating at least one container object from the container, and
executing the at least one container object, including
executing a proxy if the at least one container object is a proxy,
executing a component if the at least one container object is a component, and
executing a container if the at least one container object is a container, and
wherein the base agent processing unit recursively performs allocating and executing the at least one object to process at least one sub-object contained within the at least one object.

21. The system of claim 20 wherein the base agent processing unit allocates an occurrence of an associated base agent corresponding to the page of data.

22. The system of claim 21 wherein the object processing unit further calculates output data for the component, and streams out the data to the associated base agent.

23. The system of claim 22 wherein the object processing unit further calls a stream result method of the associated base agent.

24. The system of claim 22 wherein the object processing unit creates a reference to the associated base agent within the component.

25. The system of claim 21 wherein the object processing unit generates at least one container object from the container, and executes the at least one container object, wherein executing comprises.

26. The system of claim 25 wherein the object processing unit executes a proxy if the at least one container object is a proxy, executes a component if the at least one container object is a component, and executes a container if the at least one container object is a container.

27. The system of claim 20 wherein the base agent processing unit further allocates an occurrence of at least one associated base agent corresponding to the page of data.

28. The system of claim 27 wherein the proxy processing unit further determines if a cache entry exists for the occurrence of the at least one object, allocates a new cache entry if a cache entry is not present, and streams out a cache entry value.

29. The system of claim 28 wherein the proxy processing unit matches cache criteria for the cache entry, allocates an underlying object associated with the proxy and executes the underlying object if the cache criteria does not match, and constructs a cache key if the cache criteria does match.

30. The system of claim 29 wherein the proxy processing unit further matches at least one input parameter against at least one cache criteria entry.

31. The system of claim 28 wherein the proxy processing unit further examines the cache using a cache key.

32. The system of claim 28 wherein the proxy processing unit further creates the new cache entry in the cache, allocates an occurrence of a caching base agent, and executes the caching base agent.

33. The system of claim 32 further comprising a caching agent processing unit to create a buffer entry to capture output data, allocate an underlying object associated with the proxy, execute the underlying object, and transfer the buffer entry to the new cache entry.

34. The system of claim 33 wherein the caching agent processing unit executes a proxy if the at least one object is a proxy, executes a component if the at least one object is a component, and executes a container if the at least one object is a container.

35. The system of claim 28 wherein the proxy processing unit determines if the cache entry is empty, and streams out an error message if the cache entry is empty.

36. The system of claim 20 wherein the at least one object comprises all components within the page of data.

37. The system of claim 20 wherein the at least one object is an executable object.

38. The system of claim 20 wherein the at least one object is a component, a proxy, or a container.

39. A computer implemented method for streaming data, the method comprising:
  a Web server receiving a request for a URL (uniform request locator) page of data from a client over a wide area network (WAN) and the Web server transferring the request to an application server;
  the application server creating a base agent associated with the requested URL page and executing a method of the base agent, wherein executing a method of the base agent includes determining which object is associated with the requested URL page, allocating the determined object, and executing a method of the allocated object by passing one or more input parameters related to the requested URL page to the allocated object, wherein executing a method of the allocated object comprises
    if the object is a container, the container determining all of the sub-objects contained within the container, allocating each of the sub-objects, and executing a method of each sub-objects to cause each sub-object to stream out its own data to the base agent,
    if the object is a component, streaming out an output of the component to the base agent, and
    if the object is a proxy, determining whether the input parameters match one or more cache criteria for an underlying object, determining whether there is an entry within a component cache if the input parameters match the one or more cache criteria, and streaming out the requested data from the component cache if the entry is found in the component cache.

40. The method of claim 39, further comprising:
  if an entry is not found in the component cache, the proxy reserving an entry in the component cache based on the input parameters;
  the proxy requesting the object application to initiate an embedded execution of a caching base agent for the underlying object to be cached;
  the cache base agent executing a method of the underlying object to stream out output of the underlying object to a buffer containing accumulated output of the underlying object; and
  the proxy saving the buffer into the reserved entry in the component cache and streaming data of the reserved entry to the caching base agent which in turn streams the data to the client.

* * * * *